Sept. 29, 1925.
L. H. PETRUS
SANDING DEVICE FOR MOTOR VEHICLES
Filed Oct. 6, 1924
1,555,153
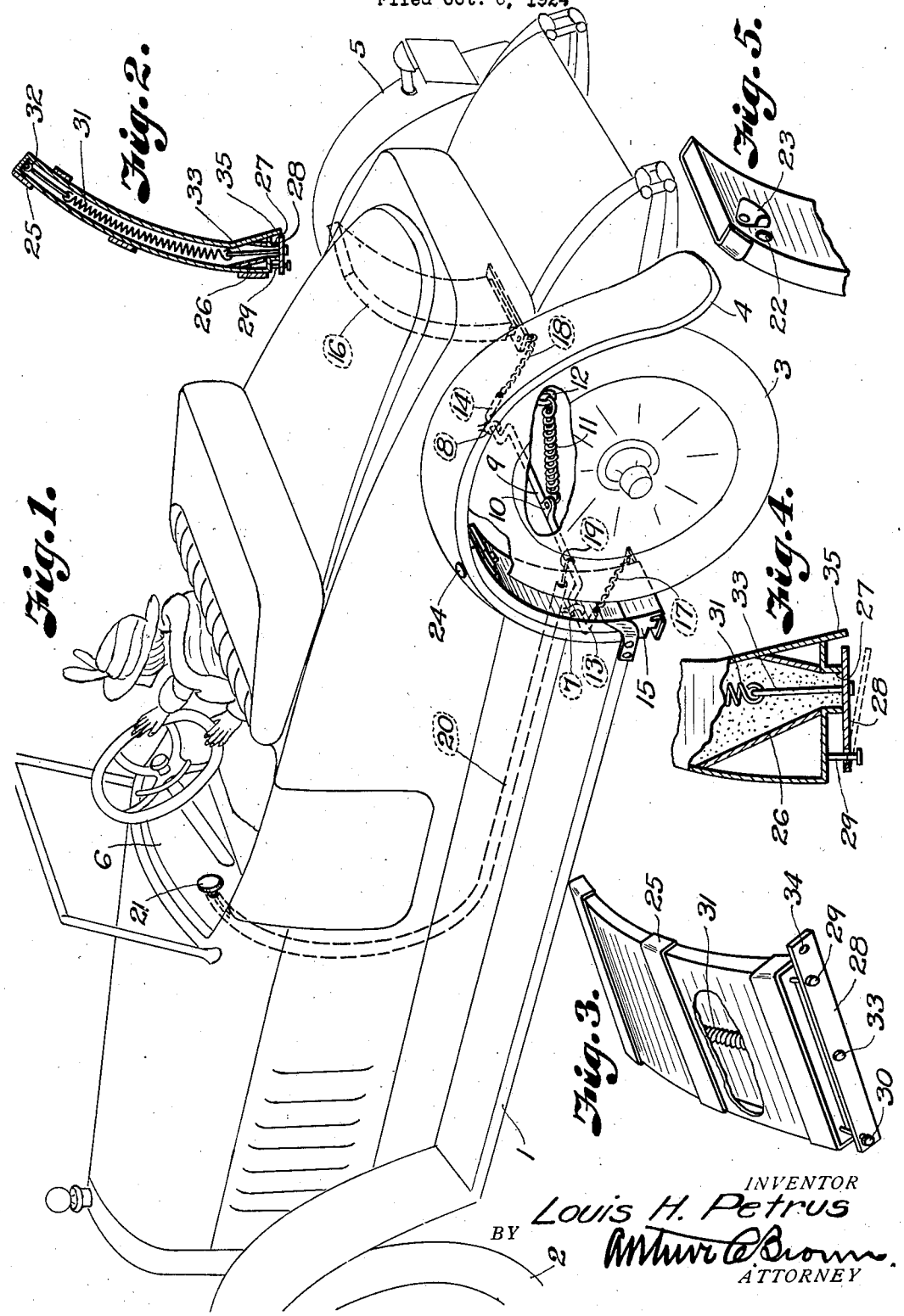
INVENTOR
Louis H. Petrus
BY Arthur C Brown
ATTORNEY Patented Sept. 29, 1925.

1,555,153

UNITED STATES PATENT OFFICE.

LOUIS H. PETRUS, OF KANSAS CITY, MISSOURI.

SANDING DEVICE FOR MOTOR VEHICLES.

Application filed October 6, 1924. Serial No. 741,956.

*To all whom it may concern:*

Be it known that I, LOUIS H. PETRUS, a citizen of the United States, residing at Kansas City, in the county of Jackson and State of Missouri, have invented certain new and useful Improvements in Sanding Devices for Motor Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to sanding devices and particularly to a sanding device for motor vehicles. The primary object of the invention is to provide means for distributing sand in front of the driving wheels of the vehicle so as to prevent skidding and slipping on smooth surfaces.

I am aware that prior to my invention, sanding devices have been used for railway trains, locomotives, tram cars and the like, so I do not claim the invention broadly as a sanding device but rather its application to a motor vehicle and the invention consists in certain novel parts and combinations of parts which adapt it for motor vehicle use.

The invention consists of certain novel parts and combinations of parts, all of which will be specifically described hereinafter, reference being had to the accompanying drawings, in which Fig. 1 is a perspective view of a motor vehicle to which my invention is applied.

Fig. 2 is a vertical, cross sectional view through the sand box.

Fig. 3 is a perspective view of the sand box.

Fig. 4 is an enlarged fragmentary sectional view of the discharge end of the sand box, and Fig. 5 is a fragmentary perspective view of the inlet end of the sand box.

In referring to the receptacles hereinafter as sand boxes, it is to be understood that the expression "sand" refers to any granular or gritty substance having the characteristic of sand.

The conventional motor vehicle illustrated in Fig. 1 and designated by the reference numeral 1 is provided with the usual front wheels 2, rear wheels 3, fenders 4 and 5, instrument board 6 and other component parts common to a motor vehicle.

Journaled in bearings 7 and 8 on the motor vehicle chassis is a crank shaft 9 having a crank or arm 10 intermediate its ends to which one end of a coil spring 11 is secured, the other end of the coil spring being anchored to the chassis as at 12. The two crank arms 13 and 14 on the ends of the crank shaft are adapted to operate certain valve mechanisms at the discharge end of the sand boxes 15 and 16 which are shown as secured to the under faces of the fenders 4 and 5. The valves which are controlled by the crank arms 13 and 14 through the medium of the flexible connections 17 and 18 will be specifically described hereinafter.

The crank shaft 9 may be operated by any suitable means but I prefer to operate it by a flexible wire 19 in a tube 20 terminating adjacent to the instrument board 6, the wire being provided with a handle or knob 21 so that it will be accessible to the driver.

The sand boxes are best shown in Figs. 2, 3 and 4. They are illustrated as comprising arcuate hollow members, each having an inlet opening 22 adapted to be conveniently closed by any suitable means as for example a gate 23. The sand boxes preferably conform to the curvature of the under side of the front portions of the rear fenders and they may be fastened to the rear fenders in any suitable manner as for example by the fastening devices 24 or by brackets ( not shown), the essential feature being that they be securely attached to some convenient part of the vehicle. There is an advantage, however in attaching them to the rear fenders and causing them to discharge in front of the rear wheels, since they can be applied without marring the appearance of the motor vehicle and since the sand will be deposited on the ground immediately in front of the rear wheels. The receptacles may be provided with bands of rubber or similar material so as to prevent rattling against the fenders, but these will not be a necessity where the receptacles are properly fitted to the fenders.

The lower ends of the receptacles are gradually reduced in order to provide a hopper-shaped discharge portion 26 having a nozzle 27 normally closed by a flat valve 28. The valve 28 is in the form of a flat bar mounted to loosely slide on the headed guide pins 29 and 30 rigidly supported by the end of the receptacle. The valve 28 is normally held in seated position by a coil spring 31, one end of which is fastened to the upper end of the receptacle as at 32 and the other end of which is connected to a headed link 33 passing through the valve 28.

As heretofore explained, one end of each valve is fastened to one of the flexible connections 17 or 18, the connection in each instance being made through an opening 34. The inner face of each receptacle is provided with a depending flange 35 in the form of a short apron next to the wheel to act as a shield for the valve and nozzle.

Assuming that the sand receptacles are provided with the requisite amount of material and the device is properly assembled, the operation will be as follows:

During normal driving the spring 11 will pull on the crank 9 so that the flexible connections 17 and 18 will not be under tension, consequently the springs 31 will hold the valves 28 closed. If the driver approaches a slippery spot in the roadway, it will be necessary only to pull on the head or handle 21 to turn the crank shaft 9 through the medium of the wire 19, then the flexible connections 17 and 18 will be put under tension to pull on the valves 28 against the coil or expansion springs 31 unseating the valves to substantially the position shown in dotted lines in Fig. 4, then the sand can discharge from the nozzle 27 in front of the rear wheels to provide a sanded surface to permit the wheels to obtain enough traction to prevent slipping or skidding. At the same time the valves are unseated, the coil springs 31 are expanded. The spreading apart of the coil spring agitates the sand so that if the sand should be slightly damp, it will not pack. This I consider an important feature of my invention.

The device is particularly advantageous for driving forward on slippery streets, especially where the brakes are applied to stop the car, because by simultaneously applying the brakes and releasing the sand, liability of skidding forward into a car ahead will be practically eliminated. The sanding device will also eliminate sidewise skidding, because the widths of the sand boxes are enough greater than the cross section of the tire to distribute sand on each side of the tire to provide the necessary friction.

While I have specifically described in detail the exact construction of the various elements of the preferred form of my invention, I do not wish to be limited to the exact details shown, but reserve the right to make such changes in form, proportion and minor details of construction as properly come within the scope of the appended claims.

What I claim and desire to secure by Letters-Patent is:—

1. In combination, a motor vehicle having rear wheel fenders, sand containing receptacles carried by the inner faces of the rear wheel fenders in front of the rear wheels, discharge nozzles in the bottom of the sanding receptacles, valves for the discharge nozzles, coil springs in the receptacles connected to the valves for normally seating them and means for unseating the valves and expanding the springs so that when the valves are unseated, the action of expanding the springs will result in agitating the sand in the receptacle.

2. In combination, a motor vehicle having front and rear wheels, sand containing receptacles carried by the vehicle in front of the rear wheels, discharge nozzles in the bottom of the sanding receptacles, valves for the discharge nozzles, coil springs in the receptacles connected to the valves for normally seating them, and means for unseating the valves and expanding the springs so that when the valves are unseated, the expanding springs will agitate the sand in the receptacles.

3. A sanding mechanism for motor vehicles, comprising a receptacle having a discharge opening, headed pins adjacent to the opening, a flat bar carried by the receptacle and normally lying against the discharge opening, constituting a valve to close the opening, the bar being bodily movable away from the discharge opening and slidable on the headed pins to provide an unrestricted flow of material over both edges of the bar.

4. A sanding mechanism for motor vehicles, comprising two receptacles, each having a discharge opening, a flat bar carried by each receptacle and normally lying against its discharge opening, constituting a valve to close the opening, each bar being bodily movable away from its opening to provide an unrestricted flow of material over both edges of the bar, a rock shaft, connections between the rock shaft and the valves to simultaneously unseat the bars upon the turning of the rock shaft in one direction, means normally urging the valves in seated position, and means for actuating the rock shaft.

In testimony whereof I affix my signature.

LOUIS H. PETRUS.